US007553547B2

(12) United States Patent
Fryxell et al.

(10) Patent No.: US 7,553,547 B2
(45) Date of Patent: Jun. 30, 2009

(54) BACKFILLED, SELF-ASSEMBLED MONOLAYERS AND METHODS OF MAKING SAME

(75) Inventors: Glen E. Fryxell, Kennewick, WA (US); Thomas S. Zemanian, Richland, WA (US); R. Shane Addleman, Benton City, WA (US); Christopher L. Aardahl, Sequim, WA (US); Feng Zheng, Richland, WA (US); Brad Busche, Raleigh, NC (US); Oleg B. Egorov, West Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 491 days.

(21) Appl. No.: 11/315,646

(22) Filed: Dec. 21, 2005

(65) Prior Publication Data

US 2007/0141364 A1 Jun. 21, 2007

(51) Int. Cl.
*B32B 25/20* (2006.01)
(52) U.S. Cl. ...................... 428/447; 528/38; 427/397.7
(58) Field of Classification Search ................ 428/447; 528/38; 427/397.7
See application file for complete search history.

(56) References Cited

U.S. PATENT DOCUMENTS

| 6,326,326 | B1 | 12/2001 | Feng et al. |
| 6,531,224 | B1 | 3/2003 | Fryxell et al. |
| 6,733,835 | B2 | 5/2004 | Fryxell et al. |
| 6,753,038 | B2 | 6/2004 | Fryxell et al. |

OTHER PUBLICATIONS

Wiacek et al., "Increased chemical activity of quaternary ammonium functionalized monolayer for anion exchange . . . " Presented at American Chemical Society, Mar. 16, 2005 (Abstract).*
Kumar et al. Langmuir (2001) 17, 7789-7797.*
Couzis et al., Abstracts of Papers, 225th ACS National Meeting, New Orleans, LA, United States, Mar. 23-27, 2003 (2003), COLL-134. American Chemical Society: Washington, D. C.*
Feng et al., "Organic Monolayers on Ordered Mesoporous Supports;" Science, 1997, pp. 923-926, vol. 276.
Zemanian et al., "Deposition of Self-Assembled Monolayers in Mesoporous Silica from Supercritical Fluids," Langmuir, 2001, pp. 8172-8177, vol. 17.
Mathauer and Frank, "Binary Sefl-Assembled Monolayers as Prepared by Successive Adsorption of Alkyltrichlorosilanes," Langmuir, 1993, pp. 3446-3451, vol. 9.
Harant et al., "Micropatterning organosilane self-assembled monolayers with plasma etching and backfilling techniques," J. Vac. Sci. Technol. B, 2005, pp. 354-357, vol. 23(2).

* cited by examiner

*Primary Examiner*—Kuo-Liang Peng
(74) *Attorney, Agent, or Firm*—Allan C. Tuan

(57) ABSTRACT

Backfilled, self-assembled monolayers and methods of making the same are disclosed. The self-assembled monolayer comprises at least one functional organosilane species and a substantially random dispersion of at least one backfilling organosilane species among the functional organosilane species, wherein the functional and backfilling organosilane species have been sequentially deposited on a substrate. The method comprises depositing sequentially a first organosilane species followed by a backfilling organosilane species, and employing a relaxation agent before or during deposition of the backfilling organosilane species, wherein the first and backfilling organosilane species are substantially randomly dispersed on a substrate.

32 Claims, 3 Drawing Sheets

BACKFILLED, SELF-ASSEMBLED MONOLAYERS AND METHODS OF MAKING SAME

STATEMENT REGARDING FEDERALLY SPONSORED RESEARCH OR DEVELOPMENT

This invention was made with Government support under Contract DE-AC0576RLO1830 awarded by the U.S. Department of Energy. The Government has certain rights in the invention.

BACKGROUND

Organosilane self-assembled monolayers can be used to functionalize the surface of a substrate. Often times, however, monolayer functional ligands interact strongly with each other or with the underlying substrate, causing the silane molecules to "bend over" and/or form defects. As a result, surface sites adjacent to the existing anchored silane molecules can be blocked, which prevents fully dense monolayer coverage. Furthermore, the undesirable interactions can reduce the performance of the material by limiting the functional ligand's ability to bind an analyte. Thus, there is a need for engineered, self-assembled monolayers, and methods for making the same, wherein attenuation of the materials's functionality due to ligand-ligand and/or ligand-substrate interactions is minimized.

SUMMARY

Self-assembled monolayers can exhibit significantly improved performance when defects have been repaired with a backfilling organosilane species. Accordingly, one aspect of the present invention encompasses an engineered, self-assembled monolayer comprising at least one functional organosilane species and a substantially random dispersion of at least one backfilling organosilane species among the functional organosilane species, wherein the functional and backfilling organosilane species have been sequentially deposited on a substrate.

Molecules of the functional organosilane species comprise an anchor, a tether, and a ligand having at least one analyte binding site. While the scope of the present invention can encompass functional organosilanes having any ligand, specific examples of the functional organosilane species can include, but are not limited to, aminoalkyltrialkoxysilanes and chlorosilanes. In some embodiments, the ligand can comprise an amine. An example of an amine includes, but is not limited to, ethylenediamine. Alternatively, the ligand can comprise an ammonium ion. In a specific embodiment, the ligand comprises a quaternary ammonium ion.

The presence of the backfilling organosilane species can enhance the chemical activity of the analyte binding site and/or the chemical stability of the monolayer. Depending on the species, the presence of the backfilling organosilane species can also alter the interfacial wettability of a material comprising the monolayer and the substrate. In some embodiments, the backfilling organosilane species can be considered inert in that it does not chemically interact with the analyte of interest. Examples of backfilling organosilane species can include, but are not limited to, alkylsilanes, arylsilanes, chlorosilanes, alkoxysilanes, and silazanes. Deposition of the backfilling species can be performed using inert silanes, one or more additional doses of a silane having a functional ligand, silanes having protecting groups, and/or silanes having simple blocking groups such as alkylating agents. As used herein, a protecting group can refer to a chemical group that precludes a functional group from entering into a chemical reaction that it would normally participate in. Examples of ligands can include, but are not limited to, carboxylates, sulfonates, and phosphates.

The substrate can comprise an oxide material. Examples can include, but are not limited to silica, titania, and alumina. The substrate is not limited to bulk oxide materials, but can also comprise an oxide film on a base material. In one embodiment, the substrate comprises a mesoporous support such as, for example, mesoporous silica, mesoporous ceramics, and aerogels.

Another aspect of the present invention encompasses a method for synthesizing an engineered, self-assembled monolayer. The method comprises depositing sequentially a first organosilane species followed by a backfilling organosilane species, and employing a relaxation agent before or during deposition of the backfilling organosilane species, wherein the first and backfilling organosilane species are substantially randomly dispersed on a substrate. The relaxation agent can attenuate competitive interactions between the first organosilane species and the substrate, between molecules of the first organosilane species, or combinations thereof. Deposition of the backfilling organosilane species can be performed under ambient conditions, heated conditions, densified fluid conditions, high pressure conditions, and/or vapor phase conditions.

The relaxation agent can comprise a solvent, examples of which can include, but are not limited to, various alcohols, toluene, and methylene chloride. The solvent can be used at room temperature or it can be heated. For example, in one embodiment, the first organosilane species comprises a chlorosilane and the relaxation agent comprises a solvent at approximately room temperature. In another embodiment, the first organosilane species comprises an alkoxysilane and the relaxation agent comprises toluene at reflux conditions. Furthermore, byproducts generated from siloxane hydrolysis, for example, alcohol, can contribute to the functional ligand relaxation effect. Accordingly, heat and/or siloxane hydrolysis byproducts can serve as additional relaxation agents.

The relaxation agent can also comprise densified fluids. Examples of densified fluids can include, but are not limited to carbon dioxide, propane, nitrogen, and methane. In one embodiment, the densified fluid can have a temperature that is greater than approximately 100° C. In another embodiment, the temperature of the densified fluid is approximately 150° C.

The method for synthesizing the engineered, self-assembled monolayer is not limited to two organosilane species (e.g., the first and backfilling organosilane species). Additional organosilane species can be deposited sequentially while employing a relaxation agent before or during deposition of the additional organosilane species.

DESCRIPTION OF DRAWINGS

Embodiments of the invention are described below with reference to the following accompanying drawings.

DETAILED DESCRIPTION

For a clear and concise understanding of the specification and claims, including the scope given to such terms, the following definitions are provided.

Backfilling organosilane species, as used herein, can refer to the latter-deposited organosilane species from among two sequentially-deposited organosilane species. In instances where more than two organosilane species are sequentially deposited, the backfilling species can refer to the organosilane that backfills earlier-deposited organosilanes. Most commonly, the backfilling species is substantially inert toward a desired analyte and/or is a different species than earlier-deposited organosilanes. However, in some embodiments, the backfilling organosilane species can be functional and/or be the same as an earlier-deposited species.

Functional organosilane species, as used herein, can refer to organosilanes terminated by a functional ligand that has an affinity for an analyte. Among others, functional organosilane species can include those having amine ligands and/or ammonium ion ligands. Specific examples can include, but are not limited to, ethylenediamine and quaternary ammonium ions, respectively. Aminoalkyltrialkoxysilanes and chlorosilanes can also serve as functional organosilane species.

Relaxation agent, as used herein, can refer to chemicals, heat, solvents, reagents, byproducts, and combinations thereof that attenuate ligand-ligand and/or ligand substrate interactions. Such interactions can occur between multiple head groups and/or between head groups and surface silanols. In some embodiments, the byproducts of silane hydrolosis can act as a relaxation agent. For example, the hydrogen chloride, alcohol, and/or amine byproducts of silane hydrolysis can interact with the silanol/headgroup adduct in such a way as to alleviate the interaction between the silanol and the head group, thereby allowing the bent-over silane to relax into an upright position. This can create a vacancy that a backfilling silane can then fill.

Figure 1:
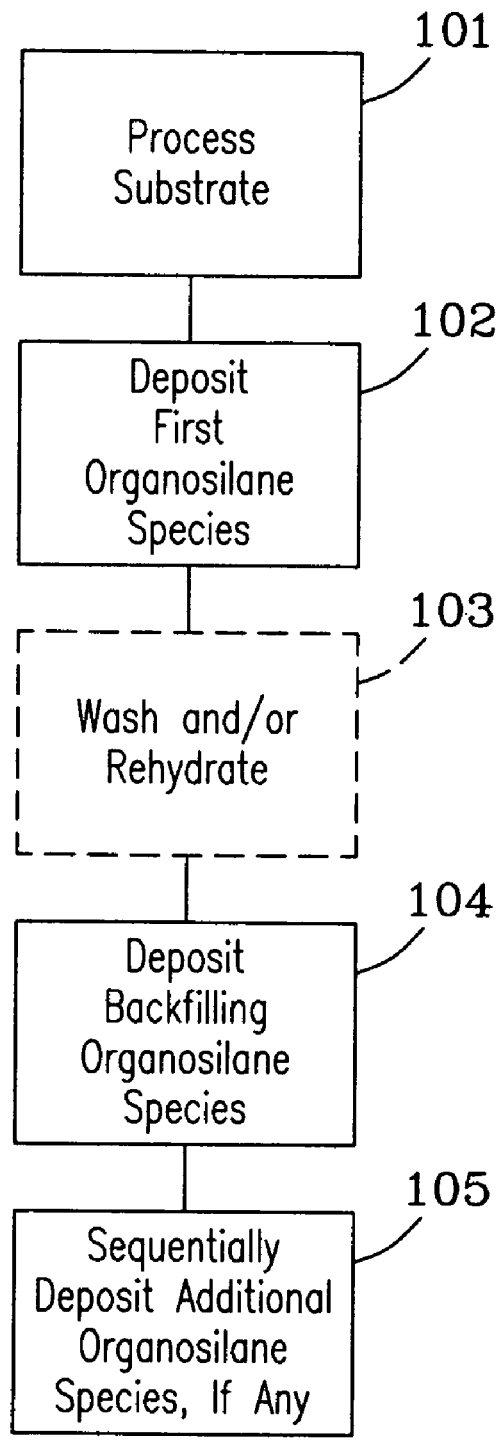
FIG. 1 is a block diagram depicting a method of making an engineered self-assembled monolayer according to one embodiment.

An embodiment of the method for synthesizing the engineered, self-assembled monolayer is depicted in FIG. 1 as a block diagram. Prior to synthesizing the material, if necessary, the substrate can be processed 101 in preparation for deposition of the first organosilane species. Preparation can include, but is not limited to, hydrating the surface. Any hydration technique that might be known to one of ordinary skill in the art is acceptable. For example, hydration can be performed using densified fluids, water vapor, organic solvents such as toluene, and any combination thereof. In one embodiment involving an oxide surface, an equivalent to two monolayers of water is deposited on the substrate surface.

Synthesis of the engineered, self-assembled monolayer begins with the addition of a first organosilane species 102, which is typically added in stoichiometric amounts based on the available surface area on the substrate. However, excesses of the first organosilane species can also be used. An optional washing and/or rehydrating step 103 can be performed prior to depositing the backfilling organosilane species. Appropriate washing/rehydrating agents include, but are not limited to, organic solvents and alcohols, specifically, isopropyl alcohol, toluene, and methylene. The agents used in the washing/rehydrating step 103 can also serve to relax the ligand-ligand and ligand-substrate interactions prior to depositing the backfilling organosilane species. If the washing/rehydration step is omitted, then a relaxation agent can alternatively be added during deposition of the backfilling organosilane species.

After the first organosilane species is deposited, the backfilling organosilane species can be deposited 104. The scope of the present invention is not limited to two organosilane species and additional organosilane species, if any, can be sequentially deposited by essentially repeating the deposition procedure for each additional organosilane species 105. A final wash and drying can then be performed to complete synthesis of the material.

In one embodiment, the first and backfilling organosilane species comprise a functional organosilane species and an inert organosilane species, respectively. In another embodiment, the first-deposited organosilane species is substantially chemically inert towards an analyte and a functional organosilane species is subsequently deposited as the backfilling species. In yet another embodiment, both the first and backfilling organosilane species comprise functional organosilanes. In still another embodiment, a first functional organosilane species is deposited followed by a second functional organosilane species, which is then followed by an inert organosilane species. Thus, the scope of the present invention is not limited to embodiments where a functional organosilane species is deposited prior to a backfilling species that is substantially inert towards an analyte, though that is the preferred embodiment.

The additional organosilane species can be the same as, or different than, the first and backfilling organosilane species. Accordingly, molecules of the additional organosilanes can comprise the same functional ligand or a different functional ligand as the previously-deposited organosilane species. Alternatively, the molecules of the additional organosilane species can have no functional ligand at all. Thus, the additional organosilane species can add functionality and/or serve as backfillers.

FIG. 2 contains diagrams showing an exemplary surface region at various instances during synthesis of an engineered, self-assembled monolayer. Referring to FIG. 2a, the substrate 201 has been hydrated and is ready for deposition of an organosilane. In FIGS. 2b and 2c, a functional organosilane species has been deposited and element numbers 205 and 206 represent undesirable ligand-substrate and ligand-ligand interactions, respectively. Referring to FIG. 2b, the ligand 203 can interact with a nearby deprotonated surface hydroxyl 204, thereby preventing another organosilane molecule from attaching to that surface site. Moreover, the ligand 203 can be unavailable as a functional ligand while it is interacting with the surface hydroxyl 204. The interaction also causes the organosilane molecule 202 to bend over, which can potentially block even more adjacent sites. Referring to FIG. 2c, the functional ligands on two nearby organosilane molecules 208 interact 206, reducing and/or eliminating the ligands' chemical activity. In some instances, the interacting molecules may be large enough to also block adjacent surface sites. Ultimately, the undesirable interactions can result in defects that prevent fully dense monolayer coverage and attenuate the chemical activity of the material.

Figure 2A:
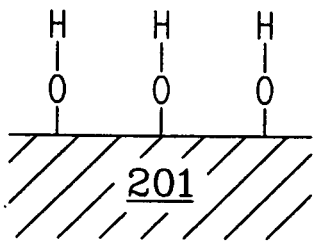
FIGS. 2(a)-(d) are illustrations of ligand-ligand and ligand-substrate interactions that can occur at a monolayer-substrate interface.
Figure 2B:
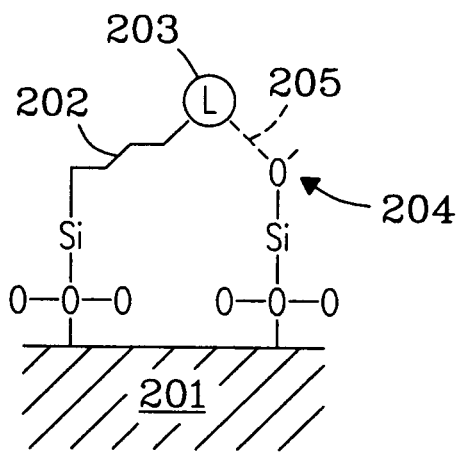
Figure 2C:
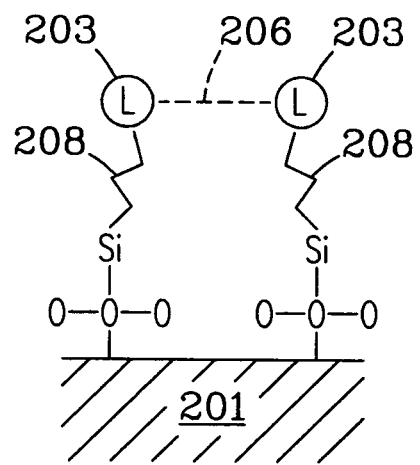
Figure 2D:
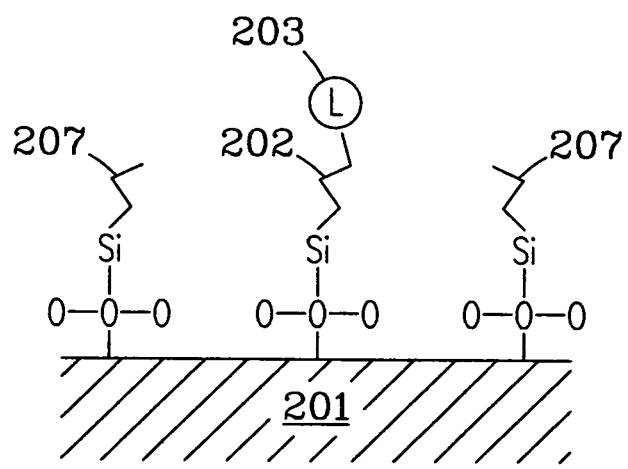

Referring to FIG. 2d, a relaxation agent has been used to weaken the ligand-ligand and ligand-substrate interactions and a backfilling organosilane species 207 has been deposited, thereby repairing the monolayer defects. The use of the backfilling species reduces the number of dangling hydroxyl groups, which might interact with functional ligands. The backfilling species also provides a steric buttress holding the functional silane in a more upright posture, thereby preventing the functional silane from bending over. Furthermore, the backfilling species can make chemical attack of the material disfavorable by repairing monolayer defects and preventing chemicals from accessing the monolayer-substrate interface. Accordingly, the presence of backfilling organosilane species can enhance not only the chemical reactivity of the overall material, but also its chemical stability.

EXAMPLE

Carbon Dioxide Sequestration

Backfilling of a self-assembled monolayer on a mesoporous support (SAMMS) with a non-reactive silane enhanced the sorbent capacity of the material. Specifically, SBA-15 mesoporous silica materials with ethylene diamine (EDA) groups covalenetly tethered to the silica surface were backfilled with n-propyltrimethoxysilane (PTMS). Either toluene or an appropriate supercritical fluid, such as $CO_2$, can be used as a relaxation agent.

Synthesis of the backfilled material using the supercritical fluid based approach is illustrated according to the following exemplary procedure. A 1 gram sample of mesoporous silica such as MCM-41 can be hydrated by exposure for 24 hours to air at 100% humidity (saturation) at room temperature and pressure. The sample can then be loaded into a sample cartridge (i.e., a stainless steel tube fitted at both ends with 20 micron stainless steel frits), along with 1 ml of the silane monomer having an EDA-based head group. The sample cartridge is placed in a stainless steel pressure vessel rated to 10,000 psig and exposed for 5-30 minutes to a supercritical fluid at 80-150° C. and a pressure of 7,500 psig. The fluid may be carbon dioxide, nitrogen, propane, and/or any other suitable fluid candidates. The sample is then rinsed with two or more vessel volumes of fresh supercritical fluid and recovered. The temperature is then lowered in the vessel to approximately 70° C. The sample can be returned to the vessel and exposed for 5 minutes to a relaxation agent, which in the present example comprises $CO_2$. The vessel is vented and 0.5 ml of the PTMS backfilling agent is added. The vessel is then repressurized to 7,500 psi at 70° C. The sample can then be rinsed with at least two more vessel volumes of fresh fluid. After the cell is vented, the sample can be recovered.

Figure 3:
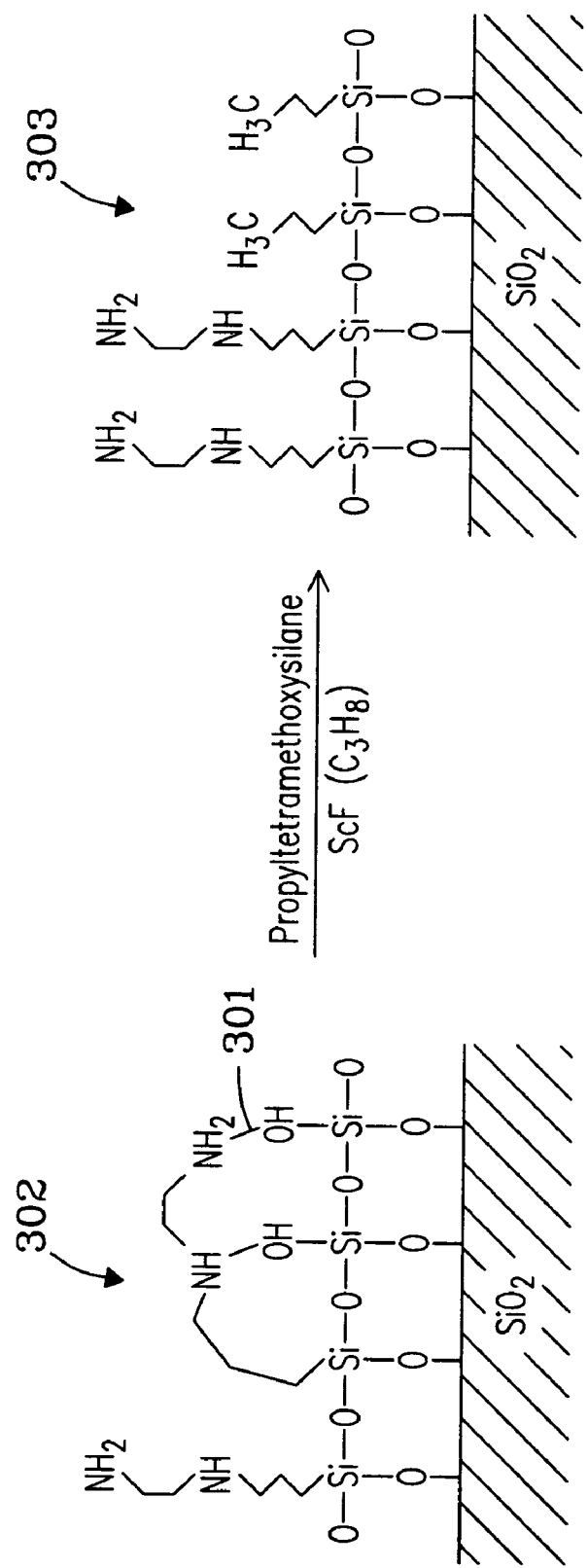
FIG. 3 is an illustration of the release of a surface-bound ethylenediamine group by propyl silane backfilling according to one embodiment.

Absent the backfilling organosilane species, a substantial portion of the EDA groups were unavailable for $CO_2$ capture because they were deactivated by surface silanol groups via hydrogen bonding. Referring to FIG. 3, the hydrogen bond between the EDA group of the surface silanol 301 causes some of the functional organosilane species 302 to bend over and form monolayer defects. During the backfilling process, hydrogen bonds can be rapidly disrupted and the silanol groups can undergo condensation reactions with the added PTMS. As a result, the monolayer defects can be repaired 303, making the EDA groups available for $CO_2$ sequestration.

$CO_2$ adsorption experiments were performed on EDA-SBA-15 materials with and without the PTMS backfilling. The results for the virgin material, without backfilling, are shown in Table 1. Two adsorption-desorption cycles were performed. Table 2 shows results for the backfilled material after a single adsorption-desorption cycle.

TABLE 1

$CO_2$ adsorption results after 2 adsorption-desorption cycles on EDA-SBA-15 material without PTMS backfilling.

| $CO_2$ Conc. (%) | Breakthrough Time (min) | | Calculated Capacity (g/g) | | Calculated Rate Coefficient ($min^{-1}$) | |
|---|---|---|---|---|---|---|
| | $1^{st}$ cycle | $2^{nd}$ cycle | $1^{st}$ cycle | $2^{nd}$ cycle | $1^{st}$ cycle | $2^{nd}$ cycle |
| 0.5 | 4.55 | 4.62 | 0.0084 | 0.0087 | 84.6 | 73.1 |
| 1.0 | 2.62 | 2.63 | 0.012 | 0.013 | 78.8 | 82.5 |

TABLE 2

$CO_2$ adsorption results after 1 adsorption-desorption cycle on EDA-SBA-15 material with PTMS backfilling.

| $CO_2$ Conc. (%) | Breakthrough Time (min) | Calculated Capacity (g/g) | Calculated Rate Coefficient ($min^{-1}$) |
|---|---|---|---|
| 0.5 | 26.42 | 0.043 | 123.0 |
| 1.0 | 14.43 | 0.056 | 131.2 |

As shown in the Table 1 and 2, the $CO_2$ capacity of the backfilled EDA SAMMS is 400-500% greater than that of the virgin material. Furthermore, the rate of $CO_2$ capture was enhanced by 40-70% by backfilling with the PTMS.

EXAMPLE $^{99}Tc$ Sequestration

Monolayers of trimethyl alkyl ammonium terminated siloxanes on SBA-15 show a very large increase in pertechnetate affinity, as measured by the partition coefficient, $K_d$, after deposition of a backfilling organosilane species. Table 3 lists the partition coefficients at two pH values for trimethyl ammonium propyl silane (TMA) materials with no backfilling species, an n-propyl siloxane backfiller deposited using liquid solvent, n-propyl siloxane backfiller deposited using a supercritical fluid (ScF), a hexyl siloxane backfiller deposited using a liquid solvent, and a hexyl siloxane backfiller deposited using a ScF. As used in the present example, $K_d$ refers to the ratio of the mass of adsorbate sorbed to the mass of adsorbate in solution.

TABLE 3

Effect of backfilling on partition ($K_d$) of $^{99}$Tc radiotracer from water into SBA-15 SAMMS of various compositions. Results given at two different pH values. TMA is trimethyl ammonium propyl silane.

| Monolayer Composition | Partition Coefficient | |
|---|---|---|
| | pH 2 | pH 8 |
| TMA | 261 | 30 |
| TMA + propyl backfill (liq.) | 303 | 92 |
| TMA + propyl backfill (ScF) | 1270 | 5400 |
| TMA + hexyl backfill (liq.) | 1480 | 2414 |
| TMA + hexyl backfill (ScF) | 2035 | 3364 |

The trimethyl alkyl ammonium siloxanes were deposited using trimethyl ammonium propyl silane. A typical reaction sequence according to embodiments of the present invention includes hydrating a 5 gram sample of mesoporous silica with 1.6 mL of water in 150 mL of toluene with rapid stirring for 1-2 hours. After hydration, the quaternary salt organosilane is added to the solution. Often, trimethylammonium alkyl organosilanes, surface coverage can be limited to about 3 silanes per square nanometer. Accordingly, complete surface coverage, since the precursor organosilane is available as a 50% methanol solution, amounts to a minimum of approximately 11.6 grams of 50% solution, or 5.78 g (0.022 moles) of silane. This assumes a typical surface area to mass ratio of 900 $m^2/g$ for the mesoporous silica. For lesser surface coverages, the amount of quaternary salt organosilane can be proportionately reduced. The mixture can then be heated to reflux for 6 hours to effect the initial quaternary salt organosilane deposition. The next step can comprise driving the condensation equilibria by removing the methanol and water via azeotropic distillation. This can be done by removing the reflux condenser, replacing it with a still head and distilling off the methanol and toluene/water azeotrope fractions. The mixture is allowed to cool to ambient temperature, and the product collected by filtration. The product is washed copiously with isopropanol to remove physisorbed quaternary salt organosilane residues, and then typically air-dried. To backfill this material, it is suspended in fresh toluene, and treated with a relaxation agent (e.g., water, alcohol, acid, etc.) capable of breaking up the interaction between the headgroup and the surface, or treated with an organosilane that will generate a relaxation agent in situ. For example, the product obtained above can be suspended in 150 mL of toluene and treated with 1.0 mL of water, followed by 0.02 moles (or more) of an alkyltrimethoxysilane (n-propyl, n-hexyl, n-decyl, etc.). The water, as well as any alcohol from silane hydrolysis, can solvate the quaternary salt head group and hydrogen bond to the silanol, helping to break up the associating between these two groups, thereby freeing up the silanol to undergo condensation chemistry with the added silane. If the added silane is an alkoxysilane, then the mixture can be once again heated to reflux for 6 hours, followed by alcohol and toluene/water azeotropic removal as described above.

If the added silane is a chlorosilane, then the mixture can be stirred at ambient temperature overnight. In this case, the relaxation agent can be the HCl that is generated as a by-product of silane hydrolysis.

The back-filling can also be carried out in supercritical fluid. In this case, the product and water are added to the reaction vessel, along with the alkoxysilane, the vessel is sealed and taken to the appropriate pressure/temperature for the supercritical fluid being used. An example includes, but is not limited to 150° C. and 7500 psi for supercritical $CO_2$.

The materials having a backfilling species exhibited a significantly higher reactivity compared to the TMA with no backfiller. The degree of enhancement in the $^{99}$Tc distribution coefficient did not correlate linearly with the amount of non-reactive silane incorporated into the backfilled monolayer. For example, propylsiloxane backfilling of a TMA monolayer in ScF media provided only a slightly higher coverage than standard liquid processing, but the effects on $K_d$ were much larger.

Accordingly, one of the preferred embodiments encompasses the use of densified fluids, such as ScFs, for relaxation agents. While the densified fluids can be applied at a wide variety of pressures and temperatures, it is commonly applied at temperatures greater than approximately 100° C. More specifically, they can be applied at approximately 150° C.

While a number of embodiments of the present invention have been shown and described, it will be apparent to those skilled in the art that many changes and modifications may be made without departing from the invention in its broader aspects. The appended claims, therefore, are intended to cover all such changes and modifications as they fall within the true spirit and scope of the invention.

We claim:

1. An engineered, self-assembled monolayer comprising at least one functional organosilane species, molecules of the functional organosilane species comprise an anchor, a tether, and a ligand having at least one analyte binding site, the monolayer characterized by a substantially random dispersion of molecules of at least one backfilling organosilane species among molecules of the functional organosilane species, wherein the functional organosilane species and the backfilling organosilane species have been sequentially deposited on a substrate.

2. The engineered monolayer as recited in claim 1, wherein the presence of the backfilling organosilane species enhances the chemical activity of an analyte binding site on the functional organosilane species.

3. The engineered monolayer as recited in claim 1, wherein the backfilling organosilane species does not chemically interact with an analyte of interest.

4. The engineered monolayer as recited in claim 1, wherein the presence of the backfilling organosilane species enhances the chemical stability of the monolayer.

5. The engineered monolayer as recited in claim 1, wherein the presence of the backfilling species alters the interfacial wettability of a material comprising the monolayer and the substrate.

6. The engineered monolayer as recited in claim 1, wherein the ligand of the functional organosilane species comprises an amine.

7. The engineered monolayer as recited in claim 6, wherein the amine comprises ethylenediamine.

8. The engineered monolayer as recited in claim 7, having a capacity for $CO_2$ of at least approximately 0.043 g $CO_2$/g sorbent.

9. The engineered monolayer as recited in claim 8, wherein the backfilling organosilane species comprises n-propyl trimethoxy silane.

10. The engineered monolayer as recited in claim 1, wherein the ligand of the functional organosilane species comprises an ammonium ion.

11. The engineered monolayer as recited in claim 1, wherein the ligand of the functional organosilane species comprises a quaternary ammonium ion.

12. The engineered monolayer as recited in claim 1, wherein the functional organosilane species comprises aminoalkyltrialkoxysilanes.

13. The engineered monolayer as recited in claim 1, wherein the functional organosilane species comprises chlorosilanes.

14. The engineered monolayer as recited in claim 1, wherein the backfilling organosilane species comprises alkyl silanes.

15. The engineered monolayer as recited in claim 1, wherein the backfilling organosilane species comprises aryl silanes.

16. The engineered monolayer as recited in claim 1, wherein the backfilling organosilane species comprises a functional organosilane.

17. The engineered monolayer as recited in claim 1, wherein the substrate comprises a mesoporous support.

18. The engineered monolayer as recited in claim 17, wherein the mesoporous support is a mesoporous ceramic or an aerogel.

19. The engineered monolayer as recited in claim 1, wherein the substrate comprises an oxide material.

20. A method for synthesizing an engineered, self-assembled monolayer comprising:
    depositing sequentially a first organosilane species followed by a backfilling organosilane species; and
    employing a relaxation agent before or during deposition of the backfilling organosilane species, which relaxation agent attenuates competitive interactions between the first organosilane species and the substrate, between molecules of the first organosilane species, or combinations thereof;
wherein molecules of the first organosilane and molecules of the backfilling organosilane species are substantially randomly dispersed on a substrate.

21. The method as recited in claim 20, wherein the presence of the backfilling organosilane species enhances chemical activity of an analyte binding site on the first organosilane species.

22. The method as recited in claim 20, wherein the relaxation agent comprises a solvent.

23. The method as recited in claim 22, wherein the solvent is selected from the group consisting of alcohols, toluene, methylene, and combinations thereof.

24. The method as recited in claim 22, wherein the first organosilane species comprises an alkoxysilane and the relaxation agent comprises a heated solvent.

25. The method as recited in claim 24, wherein the heated solvent comprises toluene at reflux conditions.

26. The method as recited in claim 22, wherein the first organosilane species comprises a chlorosilane and the relaxation agent comprises a solvent at approximately room temperature.

27. The method as recited in claim 20, wherein the relaxation agent comprises a densified fluid.

28. The method as recited in claim 27, wherein the densified fluid is selected from the group consisting of carbon dioxide, propane, nitrogen, methane, and combinations thereof.

29. The method as recited in claim 27, wherein the densified fluid has a temperature greater than approximately 100° C.

30. The method as recited in claim 27, wherein the densified fluid has a temperature of approximately 150° C.

31. The method as recited in claim 20, wherein the relaxation agent comprises byproducts of siloxane hydrolysis.

32. The method as recited in claim 20, further comprising sequentially depositing additional organosilane species and employing a relaxation agent before or during deposition of the additional organosilane species, which relaxation agent attenuates competitive interactions between previously deposited organosilane species and the substrate, between molecules of the previous deposited organosilane species, or combinations thereof, wherein the additional organosilane species and the previously deposited organosilane species are substantially randomly dispersed.

\* \* \* \* \*